US00RE40926E

(19) United States
(12) Reissued Patent
Johnson et al.

(10) Patent Number: US RE40,926 E
(45) Date of Reissued Patent: Oct. 6, 2009

(54) TOWING SYSTEM AND METHOD FOR A WATER SPORTS APPARATUS

(75) Inventors: Kevin D. Johnson, Happy Valley, OR (US); Daniel W. Meyers, Portland, OR (US)

(73) Assignee: Ho Sports Company, Inc., Redmond, WA (US)

(21) Appl. No.: 11/647,498

(22) Filed: Dec. 27, 2006

Related U.S. Patent Documents

Reissue of:
(64) Patent No.: 6,834,607
Issued: Dec. 28, 2004
Appl. No.: 10/773,644
Filed: Feb. 6, 2004

(51) Int. Cl.
*B63B 21/04* (2006.01)
*B63B 21/56* (2006.01)

(52) U.S. Cl. ..... 114/253; 114/242
(58) Field of Classification Search ..... 114/253, 114/242, 254; 244/63, 151 A, 151 B, 155 A; 441/69
See application file for complete search history.

(56) References Cited

U.S. PATENT DOCUMENTS

| | | | | |
|---|---|---|---|---|
| 3,494,319 | A | 2/1970 | Dunlap | |
| 3,498,574 | A | 3/1970 | Ernst | |
| 4,557,439 | A | 12/1985 | Puskas | |
| 4,641,597 | A | 2/1987 | Paxton | |
| 4,893,577 | A | 1/1990 | Jennings | |
| 5,094,638 | A | 3/1992 | Kobayashi | |
| 5,366,182 | A | 11/1994 | Roeseler et al. | |
| 5,816,184 | A | 10/1998 | McCulloh | |
| 6,085,682 | A * | 7/2000 | McCulloh | 114/253 |
| 6,364,251 | B1 | 4/2002 | Yim | |
| 6,453,839 | B2 | 9/2002 | Roeseler et al. | |
| 6,581,879 | B2 | 6/2003 | Bellacera | |
| D482,649 | S | 11/2003 | Eck | |
| 6,666,159 | B2 | 12/2003 | Larson et al. | |
| 6,688,553 | B2 | 2/2004 | Hsia | |
| 7,032,864 | B2 | 4/2006 | Logosz | |
| 7,182,294 | B2 | 2/2007 | Blackman | |

OTHER PUBLICATIONS

Complaint—United States District Court—District of Oregon, *WakeKite Sports, Inc., and Oregon corporation* v. *Mark Thurow,* an individual —Civil Case No. 3:06–CV–1125 Kl; 27 pages total—17 page complaint, plus 2 attachments. Aug. 4, 2006.

Answer, Affirmative Defenses and Counterclaims—Demand for Jury Trial—United States District Court—District of Oregon, *WakeKite Sports, Inc., and Oregon corporation* v. *Mark Thurow,* an individual—Civil Case No. 3:06–CV–1125 Kl; 13 pages total. Sep. 11, 2006.

Defendant Mark Thurow's Notice of Appearance—United States District Court—District of Oregon, *WakeKite Sports, Inc., and Oregon corporation* v. *Mark Thurow,* an individual—Civil Case No. 3:06–CV–1125 Kl; 2 pages total. Sep. 1, 2006.

(Continued)

*Primary Examiner*—Stephen Avila
(74) *Attorney, Agent, or Firm*—Ganz Law, P.C.

(57) ABSTRACT

A system and method for towing a water sports apparatus over a body of water behind a towing vessel. The system includes a rider towline for coupling a rider of the water sports apparatus to the towing vessel. The rider towline includes a distal end adapted to the gripped by the rider, to enable the rider to be pulled over the body of water on the water sports apparatus during forward motion of the towing vessel. The towing system also includes a lift apparatus coupled with the rider towline and adapted to lift the rider towline during forward motion of the towing vessel, so that an uppermost point of the rider towline is above and behind the towing vessel.

30 Claims, 3 Drawing Sheets

OTHER PUBLICATIONS

Reply to Defendant's Counterclaims—United States District Court—District of Oregon, *WakeKite Sports, Inc., and Oregon corporation* v. *Mark Thurow,* an individual–Civil Case No. 3:06–CV–1125 Kl; 4 pages total. Oct. 4, 2006.

Stipulation of Dismissal Under FRCP 41—United States District Court—District of Oregon, *WakeKite Sports, Inc., and Oregon corporation* v. *Mark Thurow,* an individual—Civil Case No. 3:06–CV–1125 Kl; 2 pages total. Oct. 13, 2006.

* cited by examiner

TOWING SYSTEM AND METHOD FOR A WATER SPORTS APPARATUS

Matter enclosed in heavy brackets [ ] appears in the original patent but forms no part of this reissue specification; matter printed in italics indicates the additions made by reissue.

BACKGROUND

Towable water sports devices are used in various recreational and professional activities. These devices include water skis, kneeboards, wakeboards, water ski boards, tubes and other devices which are towed behind a motor boat or other towing vessel along with a rider. Typically, the rider stands, kneels, or sits on the device, and a towline is held by the rider or attached to the device.

Wakeboarding, for example, is a recreational and professional sport that is rapidly increasing in popularity. In wakeboarding and other water sports, it is often desirable to jump off the water surface to add excitement to the activity, perform tricks or other aerial maneuvers, etc. Often, the wake created by the towing vessel is used as a ramp to facilitate jumping off the surface of the water. However, regardless of the amount of wake present, riders will often want to maximize the ability to jump off the water surface.

Accordingly, motor boats have been provided with elevated anchor points typically called wake towers to accommodate a higher angle of attachment of the rider towline. Typically, a pylon, tower or like structure extends several feet above the deck of the boat (e.g., approximately 8–10 feet). This slightly increases the angle formed by the rider towline with the surface of the water. The resulting upwardly directed force component allows the rider to jump higher off the water surface.

Various constraints limit the advantages obtained through use of such elevated anchor points. Typically, there are practical and other limitations on the height of elevated anchor point structures, for example hauling or fold-away limitations. Large towers can flex significantly, requiring stabilizing guy wires or other structural reinforcements within the boat. Towers can also adversely affect the stability of the towing vessel, due to leveraged forces exerted by the rider towline on the tower, particularly when the rider pulls from one side of the motor boat. For these and other reasons, the jumping advantage provided by an elevated anchor point within a boat is limited.

DETAILED DESCRIPTION

Figures 1, 2:
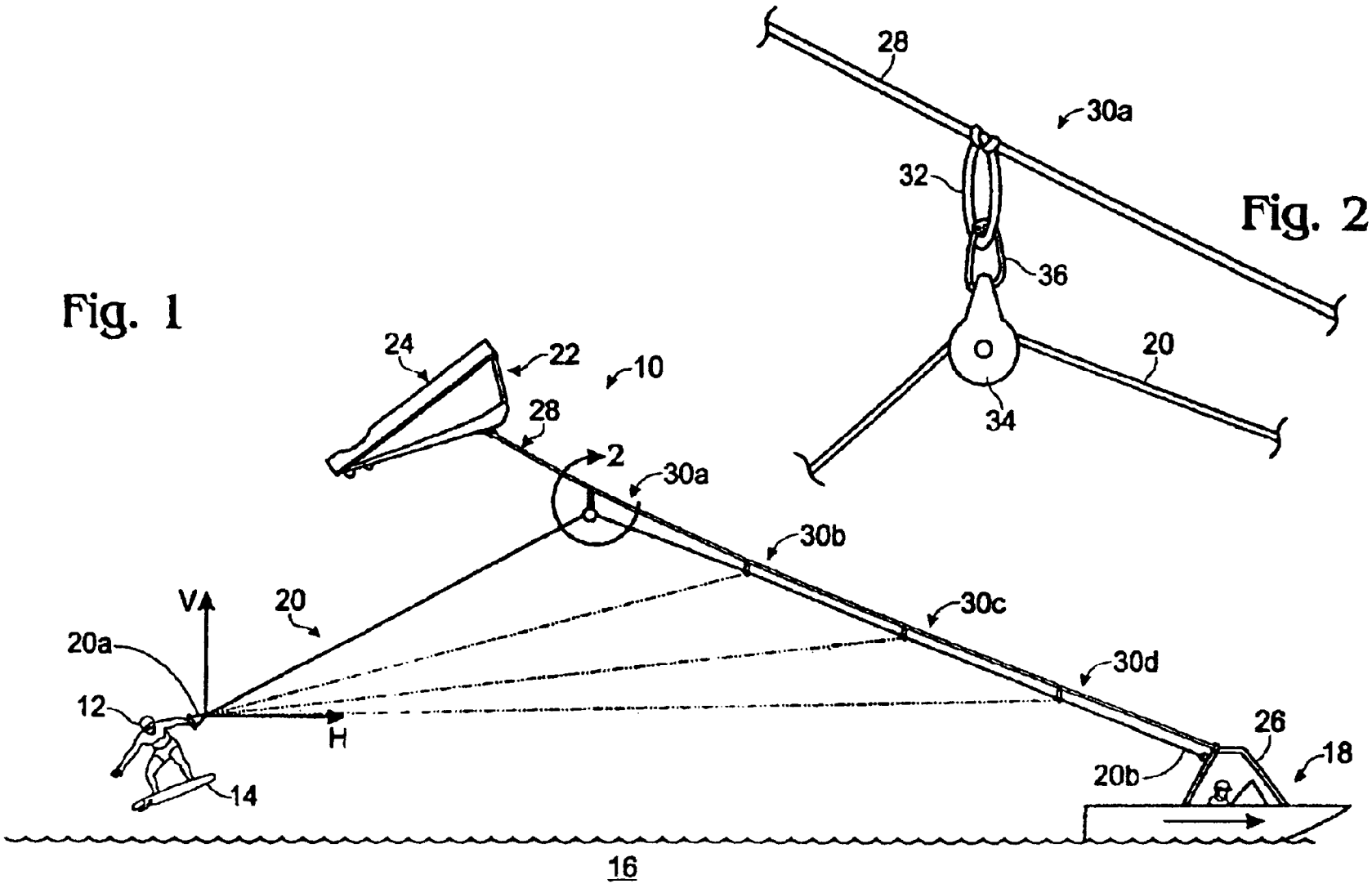
FIG. 1 depicts a water sports towing system and method according to the present description.
FIG. 2 is a partial view of the system of FIG. 1, depicting an elevated support location for the rider towline of FIG. 1.

FIG. 1 depicts a system 10, and accompanying method, for towing a water sports apparatus/device and rider over a body of water with a towing vessel. In the depicted example, the water sports device is implemented as a wakeboard 14, though it will be appreciated that water skis or other towable water sports devices may be used with the present system and method. While standing on wakeboard 14, rider 12 is towed over body or water 16 by a towing vessel such as power boat 18. Rider 12 typically grasps or is otherwise secured to a rider towline 20, and a lift system 22 is deployed to support a portion of rider towline 20 at an elevated location.

As indicated, lift system 22 may include a lift apparatus such as kite 24 secured to an attachment point on boat 18. In addition to or instead of kite 24, an airfoil, sail, chute ad/or the like may be employed. Use of such a lift apparatus allows the rider towline to be supported so that the rider towline extends upward from the rider at a significantly steeper angle than possible when the towline is attached directly to a conventional boat-mounted anchor structure. The resulting pulling force on the rider towline thus provides a substantially increased vertical force component, enhancing the ability of the rider to jump off the surface of the water, for example by traversing and jumping the wake created by boat 18 either on toe-side or heel-side wake board rides.

Boat 18 may be a conventional power boat of the type normally used for wakeboarding, waterskiing, etc. An attachment or anchor structure 26 typically is provided within boat 18, to accommodate attachment of lines for all types of towable devices, including the kite and rider. Specifically, in the depicted example, kite 24 is connected to an attachment point on an anchor structure 26 via a line referred to as a kite towline or kite bridle line 28. As indicated, bridle line 28 tethers kite 24 to boat 18 during towing, and therefore should be of sufficient test strength to withstand anticipated tensions due to wind, acceleration of the boat, pull out of the water, etc. In addition, bridle line 28 typically floats and is lightweight so as to maximize the lifting forces provided to rider 12.

Towing force is imparted to rider 12 via rider towline 20 upon forward motion boat 18 over body of water 16. It will be appreciated that rider towline 20 provides force components in both a horizontal direction and a vertical direction. The horizontally directed force causes rider 12 and wakeboard 14 to be conveyed horizontally over the surface of the water. The vertical force, to the extent present, enhances the ability of the rider to jump off the surface of the water, for example to perform aerial stunts or other special in-air maneuvers. Illustrative vertical and horizontal force vectors imparted by rider towline 20 are labeled V and H, respectively, at a distal end or handle 20a of the towline.

The magnitude of the vertical force component typically varies with the angle formed between rider towline 20 and the water surface. As indicated, rider towline 20 may be engaged with bridle line 28 so as to increase this angle. Specifically, rider towline 20 and kite bridle line 28 may be engaged so that a portion of the rider towline is supported at an elevated location, typically at or near bridle line 28. In the depicted example, rider towline 28 may be supported at any one of several different intermediate locations 30a, 30b, 30c and 30d along the length of the kite bridle line. As described below, a specific intermediate location may be selected to increase or decrease the rider towline angle, and thus vary the lift enhancement or vertical force that is provided.

Figure 4A:
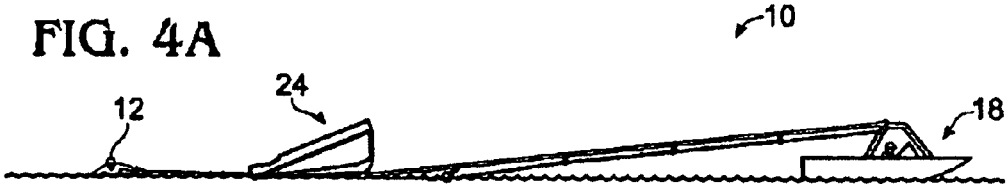
FIGS. 4A, 4B and 4C depict a method of towing a water sports apparatus according to the present description.
Figure 4B:
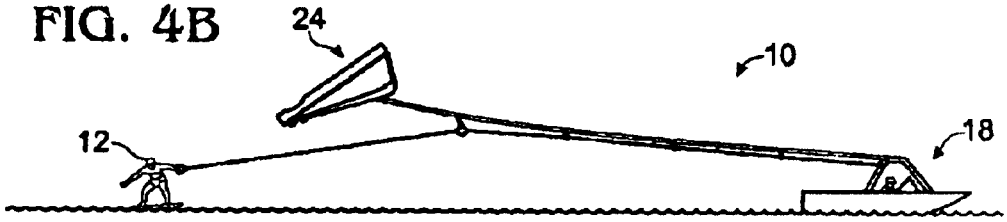
Figure 4C:
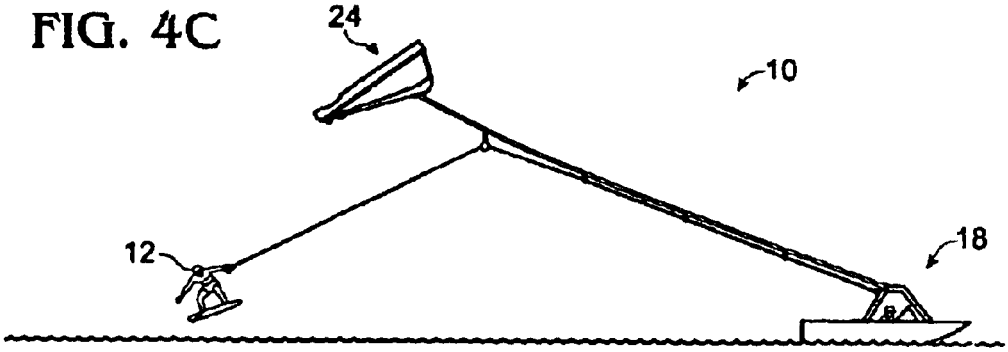

Referring now to FIG. 1 and FIGS. 4A, 4B and 4C, FIG. 1 shows towing system 10 in a fully deployed mode, after boat 18 has achieved a desired towing velocity, typically 18–22 miles per hour. The fully deployed mode of system 10 is also shown in FIG. 4C, with FIGS. 4A and 4B showing system 10 at rest and at an intermediate speed during initial acceleration after kite 24 has launched. At rest and during initial acceleration, kite 24 rests or floats on the water surface along with and typically in front of rider 12, though alternate rigging configurations may be used in which the kite is not in front of the rider. During initial acceleration, the rider and kite are pulled across the surface of the water. As discussed below, kite 24 typically is provided with various pontoon type bladders or other float material structures to help the kite to float and plane or skin over the water surface. Various rigging configurations may be employed, though the kite and rider lines typically will be sized so that rider 12 trails behind kite 24 while the kite planes over the water surface (e.g., prior to liftoff of the kite). Other rigging configurations may of course be employed, depending on considerations such as performance during launching and takedown of kite 24, the desired pulling forces and lift enhancement, etc.

Regardless of the particular configuration, kite 24 typically is designed to skin across the water at relatively low speeds, and then lift off the water surface once threshold wind speed through the kite structure is achieved. FIG. 4B shows system 10 shortly after kite liftoff has occurred. System 10 typically is designed so that kite liftoff occurs when the boat is traveling at a significantly lower velocity than the desired towing speed. For example, if the desired towing speed while wakeboarding is 20 miles per hour, then it may be desirable to design the kite to lift off the water surface when the boat accelerates to 5–15 miles per hour.

After kite liftoff, boat 18 continues to accelerate to the desired towing speed typically 18–22 miles per hour, and kite 24 continues to rise upward and behind the boat. Once the desired towing speed is reached, kite 24 is fully deployed in a position above and behind boat 18 and above and typically in front of the rider 12 (FIG. 4C). The position of the kite relative to the boat when fully deployed will typically depend on various factors, including rigging configuration, weight of the rider, velocity of the boat, relative wind speed, etc.

At the end of the towing session, kite 24 typically will glide gradually to the water surface upon slowing of boat 18, at which point the kite will skim across the water for the next deployment of another towing session, or may be reeled in and slowed. Should the kite remain aloft (e.g., due to wind), an auxiliary line operable by the rider or someone within the boat may be used to bring the kite down. For example, attached to the boat may be an auxiliary take-down line attached to the kite on the other end, so that the kite may be brought down at any time by a boat occupant. The rider, who typically is connected to the system only by towline handle 20a, may disengage from the system at any time by letting go of the towline handle. Additionally or alternatively, a reel mechanism may be employed to reel out and retract kite bridle line 28 as desired.

Referring now to FIGS. 1 and 2, the elevated support of rider towline 20 will be described in more detail. As discussed above, the rigging configuration in the depicted example supports rider towline 20 at an elevated location to provide lift enhancement. Typically, this elevated location is at a point that is above and to the rear of boat 18, to increase the upward angle at which the towline extends from rider 12. In the exemplary configurations discussed above, this is accomplished by supporting a portion of rider towline 20 at an intermediate location (e.g., location 30a, 30b, etc.) along kite bridle line 28 between kite 24 and where the bridle line attaches to boat 18.

FIG. 2 shows an example of how rider towline 20 may be supported at such an intermediate location 30a along the kite bridle line. Support at intermediate location 30a is achieved through a loop 32 attached to kite bridle line 28, with a pulley attached to the loop via a carabiner or like device. Rider towline 20 is received through pulley 34, such that rider towline 20 extends from its distal end/handle 20a (e.g., the end held by rider 12 in FIG. 1), through pulley 34 to proximal end 20b (e.g., attached to boat 18). When system 10 is fully deployed during towing, pulley 34 thus defines the uppermost point of rider towline 20. This elevated location is substantially above and to the rear of boat 18, so that the rider line imparts an enhanced vertical force component V to rider 12. The attachment mechanism and location points 30a, 30b, 30c, 30d or any other desired point on line 28 may be automatically adjustable for weight of the rider, or mechanically adjustable.

As discussed in more detail below, one or more additional loops may be employed along kite bridle 28, to provide for adjustment of the rider towline elevated support location. FIG. 1 shows several such loops below location 30a. In such a case, the rider towline may be rigged through one or more of the lower loops, as depicted in FIG. 1, or may be rigged to bypass any or all of those lower loops.

It should be appreciated that the various other methods may be employed to engage the rider and kite towlines to provide an elevated support, in addition to or instead of the exemplary pulley arrangement shown in FIGS. 1 and 2. Other pulley mechanisms may be employed; for example a reverse pulley system may be used in which the kite bridle line is run through a pulley.

Also, the depicted example has separate lines for both the kite and rider. The separate lines are engaged so as to co-extend for a certain distance away from the boat (e.g., to location 30a, 30b, 30c or 30d), beyond which point the rider line is free to diverge downward and away from the kite bridle line to where it is held by the wakeboard rider. As a result, a portion of rider towline 20 is pulled upward off the water surface as the kite is flown behind the boat. However, instead of having such an arrangement with separate full-length lines, one or both of the lines may be shortened, so that only a single length of line runs between anchor structure 36 and the point at which the divergent kite and rider lines meets. For example, rider towline 20 may be shortened so that it extends upward to terminate at an intermediate attachment point on kite bridle line 28. Alternatively, rider towline 20 may be extended to attach at the boat, with the kite bridle line being provided in a shorter segment that connects to an intermediate attachment point on the rider towline.

It can also be appreciated that line 28 may be the only attachment line to the motor boat 18, and line 20 may be shortened to attach to points 30a, 30b, 30c, 30d or other desired attachment points.

Referring again to FIG. 1, system 10 may be configured to enable adjustment of the amount of vertical lift force provided. Specifically, rider towline 20 may be engaged with kite bridle line 28 at any of several different intermediate support locations 30a, 30b, 30c and 30d along kite bridle line 28, as previously discussed. Exemplary system 10 includes four different support locations., though more or less locations may be employed, as desired.

Typically, the system is configured so that each support location provides a different performance characteristics. Specifically, the different locations in the depicted example allow variation of the angle of rider towline 20, and thus variation of the amount of lift force imparted to rider 12 during towing. Locations closer to anchor structure 26 (e.g., location 30d) provides shallower angles for rider towline 20, and thus provide less lift enhancement for the rider. Moving farther away from boat 18, successive intermediate locations 30c, 30b and 30a provide increasingly steeper line angles and thus greater lift enhancement during towing. In the four-location example, the locations may be selected to correspond to suggested rider size/weight, for example small (closest to boat 18), medium, large and extra-large.

Typically, the specific support location for the rider towline is selected based on the desired amount of unweighting, or vertical lifting force V to be imparted to the rider. This may include empirical determinations that take into account boat speed, kite lift characteristics, line rigging configurations, rider body weight and other factors. Normally, it will be desirable that the system is configured to unweight the rider and thereby enhance jumping ability, without providing a vertical force V (FIG. 1) sufficient to overcome gravity, or typically less than 1 G of vertical lift is desired to gain both an aerial effect and water effect. Accordingly, the lifting mechanism, while enhancing jumping ability and allowing a rider to catch bigger air, typically will not keep the rider aloft indefinitely.

Figure 3:
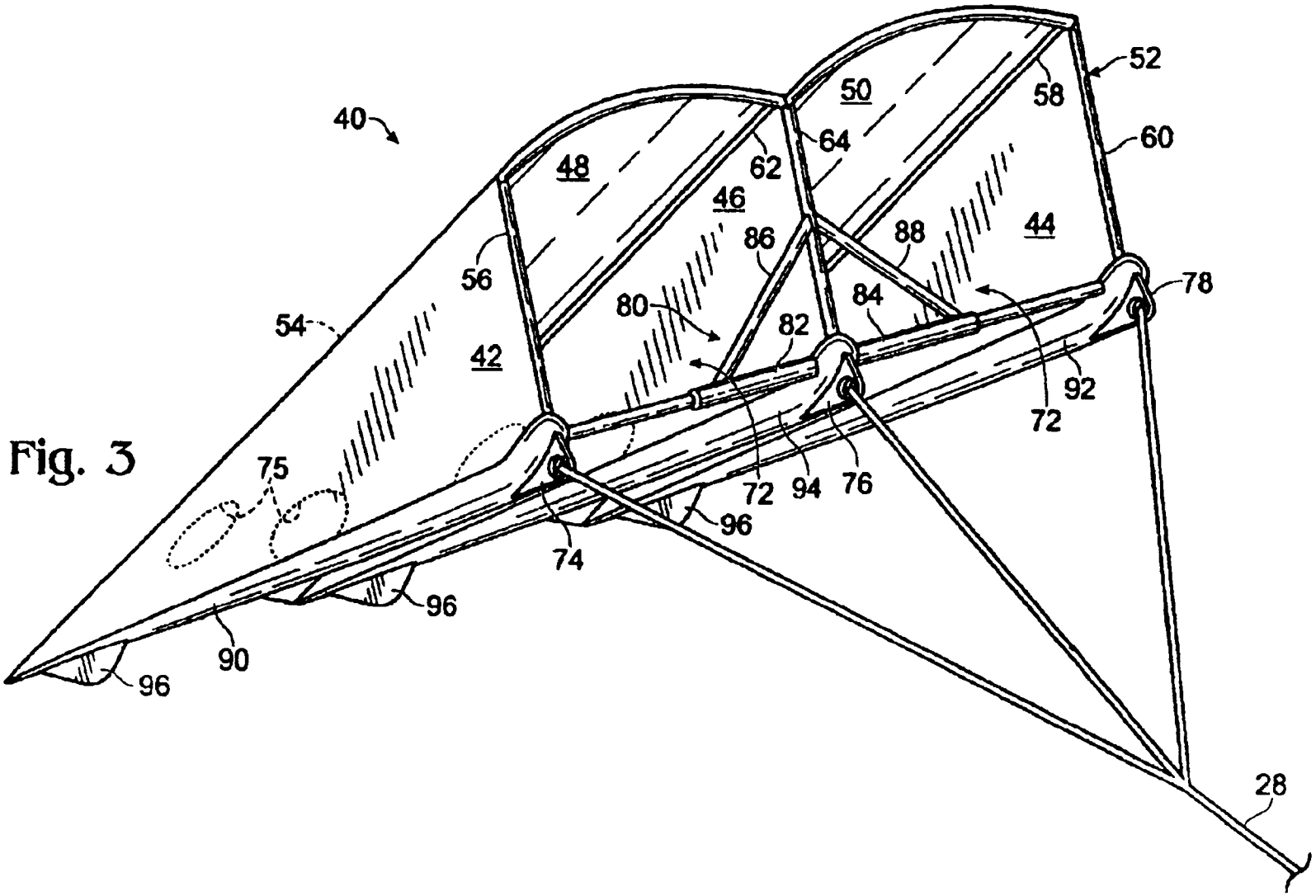
FIG. 3 depicts an exemplary lift apparatus, such as a kite, that may be employed in connection with the water sports towing system and method of the present description.

Referring now to FIG. 3, an exemplary kite 40 will be described in more detail. Though various configurations may be employed, kite 40 typically will be configured so that, when aloft, the kite has significant lateral stability so as to track in the direction boat 18 is traveling. Accordingly, kite 40 will counter lateral pulls by the rider as the rider crosses back and forth across the wake. Also, it will normally be desirable that the kite smoothly and stably lift off when pulled at speeds lower than the anticipated range of towing speeds. In wakeboard applications, 20 miles per hour is a common towing speed, so that the kite should be configured to take flight at a substantially slower speed and be fully deployed and providing significant lift by the time the boat has accelerated to 20 miles per hour.

Referring to the specific features of the depicted example, kite 40 may include a plurality of panels made of ripstop nylon or another suitable material. For example, kite 40 has two outer fin panels 42 and 44 and a center fin panel 46, with two top panels 48 and 50 extending between upper edges of the center and side fin panels. As shown, the panels may be supported with a frame 52 of lightweight rod members, such as carbon fiber, aluminum, or other such structural material rods 54, 56, 58, 60, 62 and 64. The rods may be sewn into the panels, or secured to the panels with snaps, clips, closures or other fastening mechanism or methods.

The panels of exemplary kite 40 define wind channels 72, which are shaped and otherwise configured to provide tracking and stability during flight. Bleeder holes 75 may be provided in various panels of the kite as needed. One or more bridle line attachment points 74, 76 and 78 may be provided to connect bridle line 28 to the kite. A stabilizing/spreading mechanism 80 may also be provided to space the side panels and maintain structural integrity. In the depicted example, the mechanism includes piston rods 82 and 84 and angled brace rods 86 and 88. Additionally, or alternatively, kite 40 may be provided with one or more inflatable components, such as air bladders, that are configured to maintain the structure of the kite when inflated. Inflatable components may also be employed to increase floatation of the kite.

Referring still to FIG. 3, kite 40 may include base structures adapted to facilitate flotation and planing across the water surface. In particular, the lower base portion of kite 40 includes elongate float runners 90, 92 and 94, which are provided at the bottom edges of outer fin panels 42 and 44 and center fin panel 46. The runners typically are implemented as floats, and are made of hollow plastic, foam or another material to provide flotation. The runners typically are shaped and aligned to guide the kite over the water surface prior to liftoff, and may be provided with fins or skegs 96 to enhance tracking while the kite is being dragged over the water and/or while in the air.

While the present embodiments and method implementations have been particularly shown and described, it should be understood that many variations may be made therein without departing from the spirit and scope defined in the following claims. The description should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A towing system for towing a water sports apparatus over a body of water behind a towing vessel, comprising:

a lift apparatus;

a bridle line adapted to couple the lift apparatus to an attachment point on the towing vessel, where the lift apparatus is adapted to fly above and behind the towing vessel during forward motion of the towing vessel over the body of water; and a rider towline for towing a rider of the water sports apparatus, the rider towline having a distal end adapted to be held by the rider, and wherein the towline system is adapted so that, during flight of the lift apparatus, a portion of the rider towline is supported at an intermediate location along the bridle line between the lift apparatus and the attachment point.

2. The towing system of claim 1, where the rider towline is selectively supportable at one of a plurality of different intermediate locations along the bridle line between the lift apparatus and the attachment point.

3. The towing system of claim 2, where the towing system is configured so that changing from one of the intermediate locations to another varies an angle of the rider towline that occurs during towing of the water sports apparatus.

4. The towing system of claim 2, where the rider towline includes a proximal end adapted to be secured to the towing vessel, and where during towing of the water sports apparatus, the rider towline extends from the towing vessel substantially along the bridle line to a securing device at a selected one of the plurality of different intermediate locations, and then beyond the securing device the rider towline is free to diverge away from the bridle line.

5. The towing system of claim 4, where the securing device includes a pulley adapted to receive the rider towline therethrough.

6. The towing system of claim 1, where the lift apparatus includes a float adapted to maintain the lift apparatus afloat on the body of water while not in flight.

7. The towing system of claim 1, where the lift apparatus includes a base adapted to enable the lift apparatus to plane over the body of water while not in flight.

8. The towing system of claim 7, where the base includes plural elongate floats, each having a downwardly extending fin.

9. The towing system of claim 1, where lift characteristics of the lift apparatus and placement of the intermediate location along the bridle line are selected based on rider body weight and desired level of lift enhancement, so as to provide a vertical upwardly directed force sufficient to unweight the rider without overcoming gravity.

10. A towing system for towing a water sports apparatus over a body of water behind a towing vessel, comprising:

a rider towline configured to couple a rider of the water sports apparatus to the towing vessel, the rider towline including a distal end adapted to be gripped by the rider to enable the rider to be pulled over the body of water on the water sports apparatus during forward motion of the towing vessel; and a lift system coupled with the rider towline and adapted to lift the rider towline during forward motion of the towing vessel so that an uppermost point of the rider towline is above and behind the towing vessel.

11. The towing system of claim 10, where the lift system includes a lift apparatus secured via a bridle line to an attachment point on the towing vessel, the lift apparatus being adapted to fly above and behind the towing vessel during forward motion of the towing vessel, and where the uppermost point of the rider towline is supported at an intermediate location along the bridle line between the lift apparatus and the attachment point.

12. The towing system of claim 11, where the rider towline is selectively supportable at one of a plurality of different intermediate locations along the bridle line between the lift apparatus and the attachment point.

13. The towing system of claim 12, where the towing system is configured so that changing from one of the intermediate locations to another varies an angle of the rider towline that occurs during towing of the water sports apparatus.

14. The towing system of claim 12, where the rider towline includes a proximal end adapted to be secured to the towing vessel, and where during towing of the water sports apparatus, the rider towline extends from the towing vessel substantially along the bridle line to a securing device at a selected one of the plurality of different intermediate locations, and then beyond the securing device the rider towline is free to diverge away from the bridle line.

15. The towing system of claim 11, where the lift apparatus includes a float adapted to maintain the lift apparatus afloat on the body of water while not in flight.

16. The towing system of claim 11, where the lift apparatus includes a base adapted to enable the lift apparatus to plane over the body of water while not in flight.

17. The towing system of claim 16, where the base includes plural elongate float runners, each having a downwardly extending fin.

18. A towing system for towing a water sports apparatus over a body of water behind a towing vessel, comprising:

a lift apparatus;

a bridle line having a distal end adapted to be connected to the lift apparatus and a proximal end adapted to be secured to the towing vessel;

a rider towline having a distal end with a handle adapted to be gripped by a rider of the water sports apparatus and a proximal end adapted to be secured to the towing vessel; and a securing device positioned at an intermediate location along the bridle line and adapted to engage the bridle line and the rider towline so that, when the proximal end of the bridle line and the proximal end of the rider towline are secured to the towing vessel, a portion of the rider towline between the handle and the proximal end is drawn upward upon rising of the lift apparatus.

19. A method of towing a water sports apparatus and rider across a body of water, comprising:

providing a towing vessel;

attaching a lift apparatus to the towing vessel with a bridle line;

providing a rider towline with a handle to be gripped by the rider;

engaging the rider towline with the bridle line; and accelerating the towing vessel to a desired towing speed while the handle of the rider towline is held by the rider, thereby causing the lift apparatus to fly above and behind the towing vessel, where engaging the rider towline with the bridle line is performed so that, when the handle of the rider towline is gripped by the rider, the rider two line exceeds upward from the handle toward the bridle line and is supported at an intermediate location along the bridle line, the intermediate location being between the lift apparatus and the towing vessel.

20. The method of claim 19, where the lift apparatus includes a float adapted to maintain the lift apparatus afloat on the body of water while not in flight.

21. The method of claim 19, where the lift apparatus includes a base adapted to enable the lift apparatus to plane over the body of water while not in flight.

22. The method of claim 21, where the base includes plural elongate float runners, each having a downwardly extending fin.

23. The method of claim 19, where the intermediate location is one of a plurality of different intermediate locations along the bridle line, and where the method includes selecting a desired one of a plurality of different intermediate locations, and where engaging the rider towline with the bride line is performed so that the bridle line is supported at the desired one of the plurality of different intermediate locations.

24. The method of claim 23, where selecting a desired one of a plurality of different intermediate locations is performed based on a desired relative angle of the rider towline during towing of the water sports apparatus.

*25. A towing system, comprising:*

*a lift apparatus comprising a kite or other airfoil, the kite or other airfoil having a body with a leading edge, a trailing edge, and two opposing edges therebetween, with a float disposed on each opposing edge enabling the kite or other airfoil to plane or skim over a surface while being towed below a speed that causes it to lift, and to lift off the surface and fully deploy at a speed between about 5 to about 18 miles per hours, and when fully deployed to provide a vertical, upwardly directed force to a line to a rider, enhancing the ability of a rider to jump off the surface, but generally allowing the rider to maintain contact with the surface during towing,*

*wherein the body comprises a top surface portion with downwardly extending side surface portions and the opposing edges are bottom edges of the side portions.*

*26. The towing system of claim 25 wherein the lift apparatus is structurally configured so that when aloft, the side surface portions provide significant lateral stability so as to track in the direction a towing vehicle is traveling and the lift apparatus is structurally configured with one or more inflatable components to maintain the structure of the lift apparatus when inflated.*

*27. The towing system of claim 25, further comprising:*

*a bridle line and rider towline that are coupled together and arranged so that:*

*(i) a first end of a towline is for coupling the system to a towing vehicle,*

(ii) *a second end of the towline is for coupling the system to a handle apparatus for a rider,*

(iii) *an end of the bridle end is for coupling to a lift apparatus comprising a kite or other airfoil, and*

(iv) *when the lift apparatus is coupled to the bridle line end and is towed at a speed of deployment by a vehicle coupled to the end of the towline, the lift apparatus is capable of applying the upwardly directed force to the line to a rider via the arrangement of lines, enhancing the ability of a rider to jump off the surface, but generally allowing the rider to maintain contact with the surface during towing.*

*28. A method of making a towing system, comprising a kite:*

*structurally configuring a material into one or more panels forming the kite;*

*providing means for coupling the kit to a bridle line;*

*providing one or more floats in the kite enabling the kite to plane or skim over a water surface while being towed below a speed that causes it to lift;*

*wherein the overall kite with floats is enabled to lift off the water surface and fully deploy at a speed between about 5 to about 18 miles per hours and when fully deployed to provide a vertical, upwardly directed force to a line to a rider, enhancing the ability of a rider to jump off the surface, but generally allowing the rider to maintain contact with the surface during towing; and*

*wherein the body comprises a top portion with downwardly extending side surface portions and the opposing edges are the bottom edges of the side portions.*

*29. The method of claim 28 wherein the kite is structurally configured so that when aloft the side surface portions provide significant lateral stability so as to track in the direction a towing vehicle is traveling, and wherein the kite is structurally configured with one or more inflatable components to maintain the structure of the lift apparatus when inflated.*

*30. The method of claim 29, further comprising:*

*providing a bridle line and rider towline, and coupling and arranging them so that:*

(i) *a first end of the towline is for coupling the system to a towing vehicle,*

(ii) *a second end of the towline is for coupling the system to a handle apparatus for a rider,*

(iii) *an end of a bridle line is for coupling to the kite, and*

(iv) *when the kite is coupled to the bridle line end and is towed at a speed of deployment by a vehicle coupled to the second end, the kite via the arrangement of lines is capable of applying the upwardly directed force to the line to a rider, enhancing the ability of a rider to jump off the surface, but generally allowing the rider to maintain contact with the surface during towing.*

* * * * *